United States Patent
Greene et al.

(10) Patent No.: US 10,354,445 B2
(45) Date of Patent: Jul. 16, 2019

(54) SUB-PIXEL GRAYSCALE THREE-DIMENSIONAL PRINTING

(71) Applicant: Holo, Inc., San Francisco, CA (US)

(72) Inventors: Richard M. Greene, San Rafael, CA (US); Ryan Michael Schmidt, Toronto (CA)

(73) Assignee: HOLO, INC., Oakland, CA (US)

( * ) Notice: Subject to any disclaimer, the term of this patent is extended or adjusted under 35 U.S.C. 154(b) by 215 days.

(21) Appl. No.: 15/287,205

(22) Filed: Oct. 6, 2016

(65) Prior Publication Data

US 2017/0102679 A1 Apr. 13, 2017

Related U.S. Application Data

(60) Provisional application No. 62/238,624, filed on Oct. 7, 2015.

(51) Int. Cl.
*G06F 19/00* (2018.01)
*G06T 19/00* (2011.01)
(Continued)

(52) U.S. Cl.
CPC ............ *G06T 19/00* (2013.01); *B29C 64/129* (2017.08); *B29C 64/386* (2017.08); *B33Y 10/00* (2014.12);
(Continued)

(58) Field of Classification Search
CPC ..... B41C 1/1008; G06T 15/506; G06T 15/00; G06T 17/00; G06T 19/00; G06T 15/08;
(Continued)

(56) References Cited

U.S. PATENT DOCUMENTS

| 5,403,680 A | 4/1995 | Otagawa et al. |
| 6,500,378 B1 | 12/2002 | Smith et al. |

(Continued)

FOREIGN PATENT DOCUMENTS

| EP | 2 186 625 A2 | 5/2010 |
| EP | 3194145 A2 | 7/2017 |

(Continued)

OTHER PUBLICATIONS

Paul F. Jacobs, et al., "Rapid Prototyping & Manufacturing: Fundamentals of StereoLithography," Society of Manufacturing Engineers, Jan. 1992, pp. 87-97.
(Continued)

*Primary Examiner* — Tuan A Vu
(74) *Attorney, Agent, or Firm* — Wilson, Sonsini, Goodrich & Rosati

(57) ABSTRACT

Techniques and systems for sub-pixel grayscale three-dimensional (3D) printing are described. A technique includes mapping a 3D digital model onto a 3D grid of voxels associated with a 3D printer; assigning a first intensity level to first voxels that are fully contained within the model, the first intensity level being sufficient to cure photoactive resin during a curing time; determining, based on geometric information provided by the model, containment degrees for second voxels that are partially contained within the model; assigning second intensity levels to the second voxels based respectively on the containment degrees, the second intensity levels being greater than a third intensity level and lesser than the first intensity level; assigning the third intensity level to third voxels that are outside of the model; and generating one or more graphic files based on the first, second, third voxels, and respectively assigned intensity levels.

18 Claims, 11 Drawing Sheets

(51) Int. Cl.
| | |
|---|---|
| *G06T 15/00* | (2011.01) |
| *G06T 17/00* | (2006.01) |
| *G06T 15/08* | (2011.01) |
| *G06T 15/50* | (2011.01) |
| *H04N 1/60* | (2006.01) |
| *B33Y 10/00* | (2015.01) |
| *B33Y 30/00* | (2015.01) |
| *B33Y 50/02* | (2015.01) |
| *G05B 17/02* | (2006.01) |
| *B33Y 50/00* | (2015.01) |
| *B29C 64/129* | (2017.01) |
| *B29C 64/386* | (2017.01) |

(52) U.S. Cl.
CPC .............. *B33Y 30/00* (2014.12); *B33Y 50/00* (2014.12); *B33Y 50/02* (2014.12); *G05B 17/02* (2013.01); *G06T 15/00* (2013.01); *G06T 15/08* (2013.01); *G06T 15/506* (2013.01); *G06T 17/00* (2013.01); *H04N 1/6061* (2013.01); *G05B 2219/49023* (2013.01)

(58) Field of Classification Search
CPC ..... B29C 35/0266; B33Y 30/00; B33Y 10/00; B33Y 50/02
See application file for complete search history.

(56) References Cited

U.S. PATENT DOCUMENTS

| | | | |
|---|---|---|---|
| 6,867,774 | B1 | 3/2005 | Halmshaw et al. |
| 8,217,939 | B1 | 7/2012 | Bonciu et al. |
| 8,582,118 | B2 | 11/2013 | Takahashi et al. |
| 9,457,518 | B2 | 10/2016 | Badhani et al. |
| 9,987,808 | B2 | 6/2018 | Archer et al. |
| 2007/0107615 | A1* | 5/2007 | Miyagawa ............ B41C 1/1008 101/467 |
| 2010/0125356 | A1 | 5/2010 | Shkolnik et al. |
| 2013/0297059 | A1 | 11/2013 | Grifith et al. |
| 2014/0087140 | A1* | 3/2014 | Benson ............... B29C 35/0266 428/156 |
| 2014/0306955 | A1 | 10/2014 | Dionne et al. |
| 2015/0137426 | A1* | 5/2015 | Van Esbroeck ........ B33Y 10/00 264/401 |
| 2015/0302116 | A1* | 10/2015 | Howell ................. G06T 15/506 703/1 |
| 2016/0023403 | A1 | 1/2016 | Ramos et al. |
| 2016/0185045 | A1* | 6/2016 | Linnell .................. B33Y 50/02 264/401 |
| 2017/0283766 | A1 | 10/2017 | Hribar et al. |
| 2017/0297099 | A1 | 10/2017 | Gibson et al. |
| 2017/0326807 | A1 | 11/2017 | Greene et al. |
| 2018/0020196 | A1 | 1/2018 | Terada et al. |
| 2018/0071988 | A1* | 3/2018 | Emamjomeh .......... B33Y 30/00 |
| 2018/0086003 | A1 | 3/2018 | Greene et al. |
| 2018/0194066 | A1 | 7/2018 | Ramos et al. |
| 2018/0215098 | A1 | 8/2018 | Marozin et al. |

FOREIGN PATENT DOCUMENTS

| | | |
|---|---|---|
| WO | WO-2016022336 A2 | 2/2016 |
| WO | WO-2017062630 A1 | 4/2017 |

OTHER PUBLICATIONS

Authorized Officer Jolanda Hazeleger, International Search Report and Written Opinion in PCT/US2016/055764, dated Jan. 20, 2017, 13 pages.

Co-pending U.S. Appl. No. 16/276,553, filed Feb. 14, 2019.

Hadipoespito et al. Digital Micromirror Device Based Microstereolithography for Micro Structures of Transparent Photopolymer and Nanocomposites. Solid Freeform Fabrication Proceedings. Aug. 19, 2003. pp. 13-24.

Karl, et al. TI DLP® 'Diamond' Pixel. Karl Guttag on Technology, Feb. 2016, [online] (retrieved from http://www .kguttag. com/20 12/02/09/ti -dip-diamond -pixel/), 11 pages.

Lee et al. Development of a 3D printer using scanning projection stereolithography. Sci Rep. Apr. 23, 2015;5:9875.

Rezai et al. 1.2.4. Stereolithography. Sterolithography—an overview. Science Direct. 2012. Printed Oct. 24, 2018. 9 pages. URL:<https://www.sciencedirect.com/topics/materials-science/stereolithography.

Sun et al. Projection micro-stereolithography using digital micromirror dynamic mask. Sensors and Actuators A: Physical. vol. 121, Issue 1, May 31, 2005, pp. 113-120.

U.S. Appl. No. 15/593,939 Notice of Allowance dated Dec. 20, 2018.

U.S. Appl. No. 15/593,939 Notice of Allowance dated Nov. 16, 2018.

* cited by examiner

SUB-PIXEL GRAYSCALE THREE-DIMENSIONAL PRINTING

CROSS-REFERENCE TO RELATED APPLICATION

This patent document claims the benefit of the priority of U.S. Provisional Application No. 62/238,624, filed on Oct. 7, 2015, and entitled "SUB-PIXEL GRAYSCALE THREE-DIMENSIONAL PRINTING," which is incorporated herein by reference in its entirety.

BACKGROUND

This patent document relates to three-dimensional (3D) printing using photopolymers.

Photopolymer-based 3D printers that use bottom-up illumination can project light upwards through an optically transparent window into a vat of photoactive resin to cure at least a portion of the resin. Such printers can build a 3D structure by forming one layer at a time, where a subsequent layer adheres to the previous layer. The light can be patterned to cause some portions of the resin to cure and other portions not to cure, thereby creating substructures of the 3D structure.

SUMMARY

This patent document describes technologies relating to sub-pixel grayscale three dimensional (3D) printing. In one aspect, a described technique includes obtaining a digital model that describes a three-dimensional structure; mapping the digital model onto a three-dimensional grid of voxels associated with a three-dimensional printer; assigning a first intensity level to one or more first voxels of the grid of voxels that are fully contained within the digital model, the first intensity level being sufficient to cure photoactive resin during a predetermined curing time associated with the three-dimensional printer; determining, based on geometric information provided by the digital model, one or more containment degrees for one or more second voxels of the grid of voxels that are partially contained within the digital model; assigning one or more second intensity levels to the one or more second voxels based respectively on the one or more containment degrees, the one or more second intensity levels being greater than a third intensity level and lesser than the first intensity level; assigning the third intensity level to one or more third voxels of the grid of voxels that are outside of the digital model; and generating one or more graphic files based on the one or more first voxels, the one or more second voxels, the one or more third voxels, and the assigned intensity levels. Other implementations can include corresponding systems, apparatus, and computer program products.

These and other implementations can include one or more of the following features. Implementations can include sending the one or more graphic files to the three-dimensional printer. Determining the one or more containment degrees can include determining a number of first points within a voxel that are at least partially contained by the digital model; determining a number of second points within the voxel that are not contained by the digital model; and determining a containment degree of the voxel based on the number of first points and the number of second points. Determining the one or more containment degrees can include determining a covered volume within a voxel that is contained by the digital model; and determining a containment degree of the voxel based on the covered volume and a total volume of the voxel. Mapping the digital model onto the three-dimensional grid of voxels can include slicing the digital model into two-dimensional slices and mapping each slice onto a two-dimensional grid of pixels. In some implementations, the one or more second voxels of the grid of voxels are sliced to form one or more pixels. Determining the one or more containment degrees can include determining a number of first points within a pixel of the one or more pixels that are at least partially contained by the digital model; determining a number of second points within the pixel that are not contained by the digital model; and determining a containment degree of the pixel based on the number of first points and the number of second points. Implementations can include adjusting the one or more second intensity levels based on a nonlinear characteristic of the photoactive resin. Implementations can include adjusting the one or more second intensity levels based on a nonlinear characteristic of a light source within the three dimensional printer. Implementations can include scaling the digital model based on a scaling factor. Mapping the digital model can include slicing the scaled digital model. The one or more containment degrees can be based on combinations of groups of pixels from slices of the scaled digital model.

A system can include a processor configured to perform operations; and a memory structure coupled with the processor, the memory structure configured to store a digital model that describes a three-dimensional structure. The operations can include mapping the digital model onto a three-dimensional grid of voxels associated with a three-dimensional printer; assigning a first intensity level to one or more first voxels of the grid of voxels that are fully contained within the digital model; determining, based on geometric information provided by the digital model, one or more containment degrees for one or more second voxels of the grid of voxels that are partially contained within the digital model; assigning one or more second intensity levels to the one or more second voxels based respectively on the one or more containment degrees, the one or more second intensity levels being greater than a third intensity level and lesser than the first intensity level; and generating one or more graphic files based on the one or more first voxels, the one or more second voxels, and the assigned intensity levels. The first intensity level is sufficient to cure photoactive resin during a predetermined curing time associated with the three-dimensional printer. The one or more second intensity levels being greater than a third intensity level and lesser than the first intensity level. In some cases, the one or more second intensity levels can include two or more different intensity levels that are less than the first intensity level. The operations can include assigning the third intensity level to one or more third voxels of the grid of voxels that are outside of the digital model, where the one or more graphic files are generated based on the one or more third voxels.

A 3D printer system can include a vat capable of holding a liquid including a photoactive resin, wherein the vat includes a window; a build plate configured and arranged to move within the vat during three-dimensional printing of a structure on the build plate; a light projection device to project light through the window; and a controller to control the printing of the structure, movement of the build plate, and light modulation of the light projection device. The controller can be configured to perform operations that include mapping a digital model onto a three-dimensional grid of voxels; assigning a first intensity level to one or more first voxels of the grid of voxels that are fully contained within the digital model, wherein the first intensity level is sufficient to cure photoactive resin during a predetermined curing time; determining, based on geometric information provided by the digital model, one or more containment degrees for one or more second voxels of the grid of voxels that are partially contained within the digital model; assigning one or more second intensity levels to the one or more second voxels based respectively on the one or more containment degrees, the one or more second intensity levels being greater than a third intensity level and lesser than the first intensity level; generating layer information based on the one or more first voxels, the one or more second voxels, and the assigned intensity levels; and controlling the light projection device based on the layer information. The operations can include assigning the third intensity level to one or more third voxels of the grid of voxels that are outside of the digital model, where the layer information is based on the one or more third voxels. In some implementations, the layer information can include one or more graphic files. In some implementations, the layer information can include, for each layer, a sequence of a bits to control light modulation through a grid of pixels by a light projection device.

Particular implementations disclosed herein can provide one or more of the following advantages. A described technology can be used to smooth out edges in three-dimensional printing. A described technology can use grayscale values to effectively position purely vertical features with sub-pixel precision, sub-voxel precision, or both. A described technology can be used to more accurately print a 3D structure.

Details of one or more implementations are set forth in the accompanying drawings and the description below. Other features and advantages may be apparent from the description and drawings, and from the claims.

BRIEF DESCRIPTION OF THE DRAWINGS

Like reference numbers and designations in the various drawings indicate like elements.

DETAILED DESCRIPTION

Figure 1:
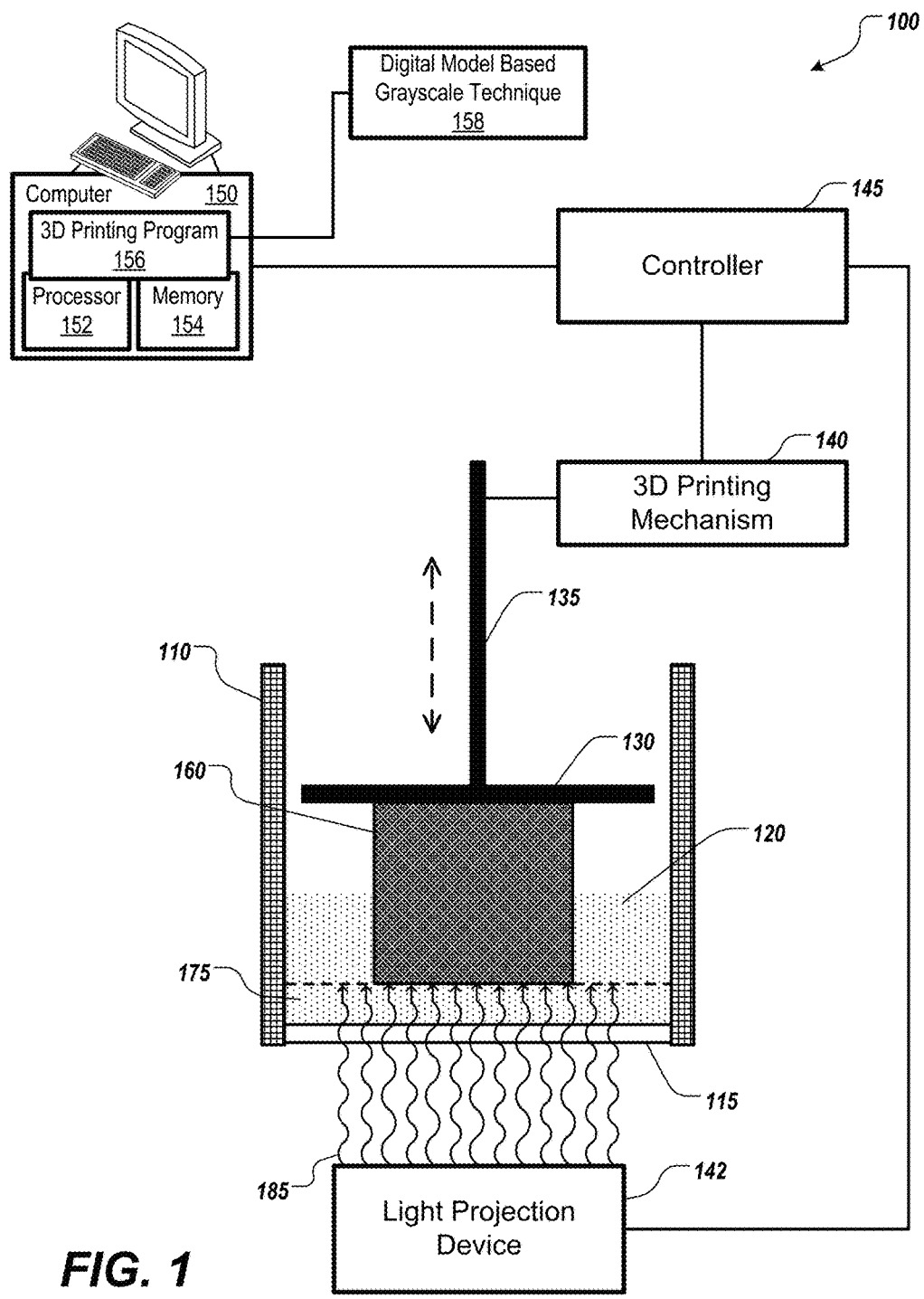
FIG. 1 shows an example of a 3D printing system coupled with a computer.

FIG. 1 shows an example of a 3D printing system 100 coupled with a computer 150. The computer 150 can provide information about a 3D structure to the 3D printing system 100 for printing. The computer 150 can communicate with a controller 145 of the printing system 100 via a wireline or wireless connection. The controller 145 can include integrated circuit technology, such as an integrated circuit board with embedded processor and firmware to control various system components such as a 3D printing mechanism 140 and a light projection device 142.

The system 100 includes a vat 110 to hold a liquid 120, which includes one or more photoactive resins. The vat 110 includes a window 115 in its bottom through which light is transmitted to cure resin to form a 3D printed structure 160 in a layer-by-layer build process. The 3D printed structure 160 is shown as a block, but as will be appreciated, a wide variety of complicated shapes can be 3D printed. The structure 160 is 3D printed on a build plate 130, which can be connected by a rod 135 to a 3D printing mechanism 140. The printing mechanism 140 can include various mechanical structures for moving the build plate 130 within the vat 110. This movement is relative movement, and thus the moving piece can be build plate 130, the vat 110, or both, in various implementations.

In some implementations, the window 115 includes a material such as polydimethylsiloxane (PDMS) to prevent resin from adhering to the window 115 during a curing procedure. Other techniques can be used to prevent resin from adhering to the window 115 such as a photo-inhibition technique that prevents resin from curing within a section of the vat 110 immediately above the window 115, while allowing resin to cure further away from the window 115.

The light projection device 142 can be positioned below the window 115. The controller 145 can operate the light projection device 142 to project a pattern of light 185 into the vat 110 to form substructures of the structure 160. The light 185 has a wavelength which is used to create the 3D structure 160 on the build plate 130 by curing the photoactive resin in the liquid 120 within a photo-initiation region 175, in accordance with a defined pattern or patterns. The wavelength can be selected based on the characteristics of the photoactive resin in the liquid 120. The build plate 130 can start at a position near the bottom of the vat 110, and varying patterns of the light 185 are directed through the window 115 to create layers of the solid structure 160 as the build plate 130 is raised out of the vat 110 by the printing mechanism 140. In some implementations, the printing mechanism 140 can employ a stepwise separation mechanism that raises the build plate 130 by a predetermined amount after each layer completion, e.g., after a predetermined curing time. In some implementations, the printing mechanism 140 can include mechanisms to aid in separation, e.g. by providing a rotation out of the plane of FIG. 1. In some implementations, the printing mechanism 140 can employ a continuous separation mechanism that continuously raises the build plate 130.

The light projection device 142 can be configured to modulate its light output based on a two dimensional grid of pixels. In some implementations, the light projection device 142 can include a pixel addressable filter to allow controlled amounts of light to pass at some pixel locations while blocking or deflecting light at other pixel locations from a light source within the light projection device 142. A pixel addressable filter can include a digital micro-mirror device (DMD). In some implementations, the light projection device 142 can include a pixel addressable light source to produce controlled amounts of light at some pixel locations and not produce light at other pixel locations. In some implementations, the light projection device 142 includes a liquid crystal display (LCD) device, discrete light emitting diode (LED) array device, laser, or a digital light processing (DLP) projector.

In some implementations, the 3D printing system 100 can include sensors and be designed to modify its operations based on feedback from these sensors. For example, the 3D printing system 100 can use closed loop feedback from sensors in the printer to improve print reliability. Such feedback sensors can include one or more strain sensors on the rod 135 holding the build plate 130 to detect if adhesion has occurred and stop and/or adjust the print, and one or more sensors to detect polymer conversion, such as a spectrometer, a pyrometer, etc. These sensors can be used to confirm that the 3D printing is proceeding correctly, to determine if the resin has been fully cured before the 3D printing system 100 proceeds to the next layer, or both. Moreover, in some implementations, one or more cameras can be used along with computer vision techniques to check that the print is proceeding as expected. Such cameras can be positioned under the vat 110 to examine the output, e.g., 3D printed layer, which the controller 145 can compare to the input, e.g., mask or layer image.

The computer 150 can include a processor 152, memory 154, and interfaces such as a network interface or a Universal Serial Bus (USB) interface. The processor 152 can be one or multiple processors, which can each include multiple processor cores. The memory 154 can include volatile memory such as Random Access Memory (RAM). The memory 154 can include non-volatile memory such as flash memory or read-only memory (ROM). The computer 150 can include one or more types of computer storage media and devices, which can include the memory 154, to store instructions of programs that run on the processor 152. For example, a 3D printing program 156 can be stored in the memory 154 and run on the processor 152 to implement the techniques described herein. In some implementations, the controller 145 can include the 3D printing program 156.

The 3D printing program 156 can transform a digital model into a sequence of layers that collectively describe the structure 160. The 3D printing program 156 can access a file containing mesh data that represents a digital model. Mesh data can include descriptions of geometric shapes such as polygons and their locations within the digital model. The 3D printing program 156 can map the digital model into three-dimensional discrete points called voxels. In some implementations, a voxel can be mapped to a pixel within a layer. In some implementations, the digital model can be sliced into grids of pixels and each pixel represents a voxel.

A voxel can be fully contained within the digital model, partially contained within the digital model, or outside of the digital model. Accordingly, each voxel can be associated with a containment degree. For example, a voxel that is fully contained can have a containment degree of 100%; a voxel that is outside can have a containment degree of 0%; and a voxel that is partially contained within the digital mode can have a containment degree based on how much of it is included in the model and can be less than 100%, but greater than 0%.

The 3D printing program 156, the controller 145, or both can employ a digital model based grayscale technique 158 to provide sub-pixel resolution and smoothing capabilities. The grayscale technique 158 can smooth out edges between different layers of the structure 160 and edges within a layer of the structure 160. The grayscale technique 158 can assign light intensity levels based on a voxel's degree of containment. The light intensity levels can include a white level for 100% containment, a black level for 0% containment, and multiple grayscale levels there between for partial containment within a digital model. The partial containment values can be computed based on the geometry of the digital model. Based on the output of the grayscale technique 158, the 3D printing program 156, the controller 145, or both can output layer information, such as graphic files or light modulation command sequences, that represent respective patterns of light to be generated for each layer of the model.

Figure 2:
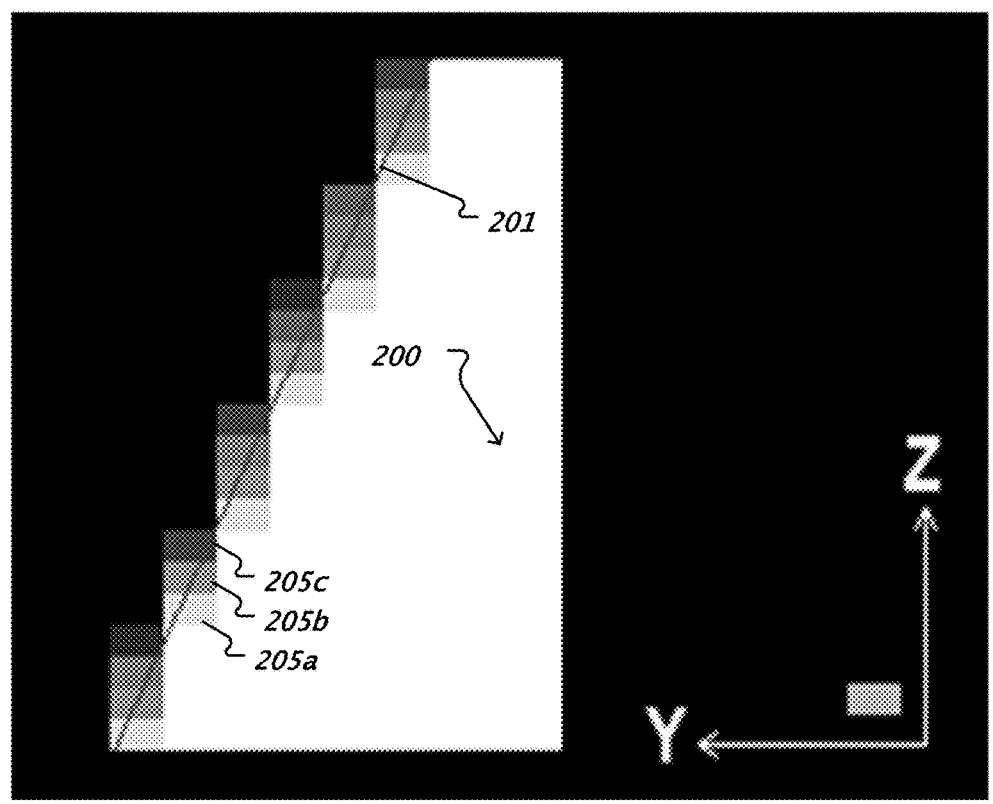
FIG. 2 shows a cross section of an example of a digital model mapped onto voxels using a model based grayscale technique.

FIG. 2 shows a cross section of an example of a digital model 200 mapped onto voxels using a model based grayscale technique. The digital model 200 is analyzed and a boundary line 201 is determined. In this example, the boundary line 201 spans multiple slices of the digital model 200. The boundary line 201 traverses several voxels including voxels 205a, 205b, and 205c. Since the boundary line 201 intercepts these voxels 205a-c at different points, different volumes are swept by the line 201, and, accordingly different containment degrees are produced. Since voxel 205a is mostly inside of the digital model 200, it will have a higher containment degree and can be assigned a higher grayscale value than voxel 205c which is mostly outside of the digital model 200.

Figure 3:
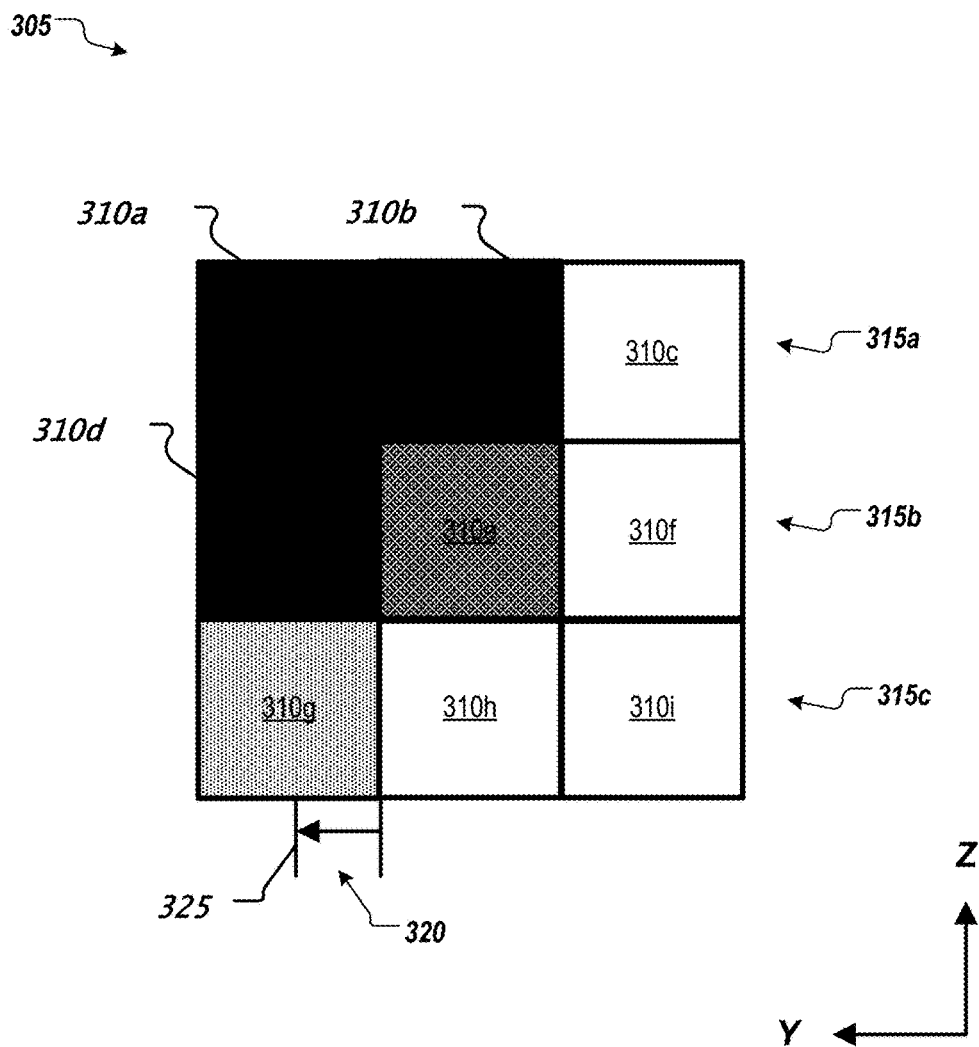
FIG. 3 shows a cross section of an example of a digital model mapped onto voxels using a model based grayscale technique to achieve sub-voxel resolution.

FIG. 3 shows a cross section of an example of a digital model mapped onto voxels using a model based grayscale technique to achieve sub-voxel resolution. The digital model is mapped onto a grid 305 of voxels including voxels 310a-i that are arranged in layers including layers 315a-c. In some implementations, layer 315c is formed initially, followed by layer 315b, and layer 315a. The voxels 310a-i in each layer 315a-c can be represented as a grid of pixels, which can subsequently cause a light source to project patterned light into a vat of resin to form a layer of a 3D structure.

Voxels 310a, 310b, and 310d that are not in the model are black. Voxels 310c, 310f, 310g, and 310i that are fully contained in the model are white. Partially contained voxels 310e, 310g are grayscale; note that there can be multiple possible grayscale values. In some implementations, the size in the Z dimension of the voxels 310a-i is set by a vertical thickness parameter. In some implementations, the sizes within the X and Y dimensions of the voxels 310a-i are set by a light source's resolutions within the X and Y dimensions. In this example, the sizes in the X and Y dimensions of the voxels 310a-i are both 50 microns, and the size in the Z dimension is 10 microns. However, a feature of the model may not be a multiple of a voxel's dimensions. For example, a horizontal feature of the model may extend into voxel 310g by a distance 320 of 20 microns from adjacent voxel 310h. Since the adjacent voxel 310h is at a white intensity level, that voxel 310h will be completely cured within a predetermined curing time for layer 315c. The grayscale intensity level, being less than the white intensity level, is assigned to voxel 310g, hence voxel 310g will not be completely cured within the predetermined curing time for layer 315c. Instead, the curing process can harden the resin in a direction from the white voxel 310h to a midpoint 325 within the grayscale voxel 310g, thereby substantially reproducing in the printed structure the actual extent of the model into that voxel. In some implementations, the hardness of the grayscale voxel 310g when printed may be less than the hardness of the white voxel 310h when printed, but nonetheless a substructure is created within the grayscale voxel 310g. A grayscale technique can place a grayscale voxel next to a white voxel in the same layer to ensure that a substructure will adhere to the main structure. However, a grayscale voxel that is isolated from a white voxel in a layer may not result in any substructures formed within the resin vat. However, it may generate a substructure if there was a white voxel in the immediately preceding formed layer. In some implementations, the grayscale technique can remove isolated grayscale pixels. In some implementations, a 3D printing technique can add structural support structures to the digital model, which can support isolated pixels.

Figure 4:
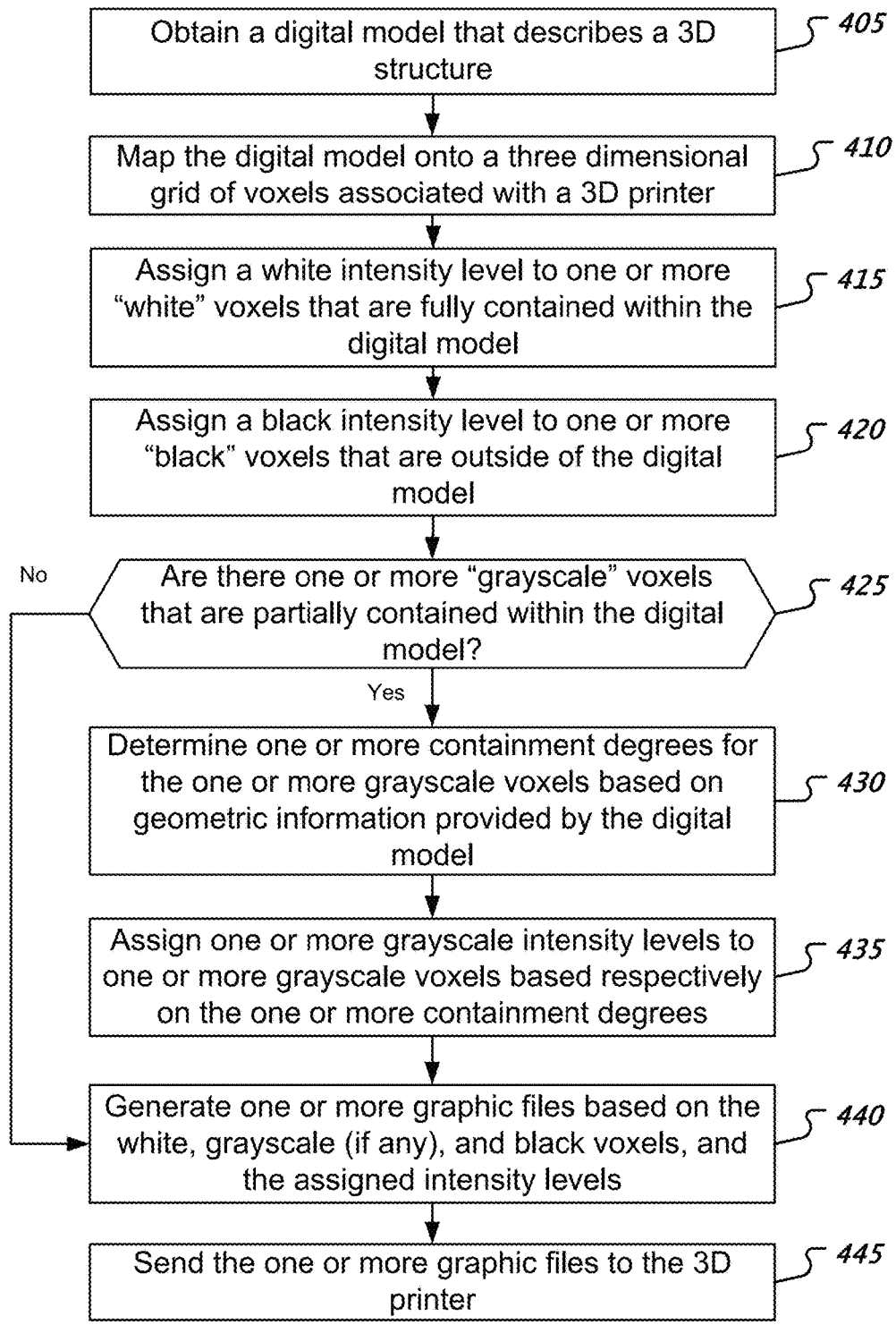
FIG. 4 shows a flowchart of an example of a process that transforms a digital model into data suitable for rendering on a 3D printer.

FIG. 4 shows a flowchart of an example of a process that transforms a digital model into data suitable for rendering on a 3D printer. A device such as a printer controller or a computer can perform this process. At 405, the process obtains a digital model that describes a 3D structure. Obtaining a digital model can include accessing a file that defines the meshes that cover the surface of the structure. The file can be in a format such as the STL (STereoLithography) file format or the Polygon File Format (PLY). Other types of file formats are possible. In some implementations, the digital model is received over a network connection. For example, a user can upload a digital model to a server on the Internet for rendering to a 3D printer. In some implementations, a digital model can be created from actual objects. For example, a 3D scanner such as Magnetic resonance imaging (MM) scanner, computed tomography (CT) scanner, or laser scanner can be used to generate digital models. In some implementations, a digital model can be generated by different images of an object. In some implementations, a digital model can be generated based on a microtome sectioning process.

At 410, the process maps the digital model onto a three dimensional grid of voxels associated with a 3D printer. Mapping the digital model can include identifying voxels that are fully contained within the digital model, voxels that are partially contained within the digital model, and voxels that are outside of the digital model. In some implementations, the process can receive one or more parameters that describe the capabilities of the 3D printer such as resolutions in the X, Y, and Z dimensions, and maximum sizes for each dimension. The process can use these parameters to determine the number and shape of voxels for the grid. In some implementations, each voxel in the grid can correspond to a voxel that the 3D printer can form. In some implementations, each voxel in the grid can correspond to a pixel that the 3D printer can form within a layer. In some implementations, a voxel is sliced in an X-Y plane at its midpoint location along the printer's formation axis, e.g., Z axis, which is perpendicular to that plane, to form a corresponding pixel.

At 415, the process assigns a white intensity level to one or more "white" voxels that are fully contained within the digital model. The white intensity level is sufficient to cure photoactive resin during a predetermined curing time for a layer. In some implementations, the white intensity level is a percentage (e.g., 90% or 95%) of a maximum intensity level generated by a 3D printer; in this case, the maximum intensity level exceeds an intensity level sufficient to cure photoactive resin. Note that different photoactive resins can require different curing intensities.

At 420, the process assigns a black intensity level to one or more "black" voxels that are outside of the digital model. These black voxels do not constitute the 3D structure described by the digital model. In some implementations, the black intensity level is a zero intensity level that inhibits light. In some implementations, assigning a black intensity level is accomplished by initializing a data structure defining the grid to all zeros, where zero represents the zero intensity level. After initialization to all zeros, the process can assign white and grayscale intensity levels.

At 425, the process determines whether there are one or more "grayscale" voxels that are partially contained within the digital model. If none, the process continues at 440. Otherwise, at 430, the process determines one or more containment degrees for the one or more grayscale voxels based on geometric information provided by the digital model. The process can determine a voxel's degree of containment based on a sampling technique, super sampling technique, or a geometric technique; other techniques are possible.

At 435, the process assigns one or more grayscale intensity levels to one or more grayscale voxels based respectively on the one or more containment degrees. If the digital model, for example, covers 60% of the volume of a voxel (e.g., 60% containment degree), then the process can assign an intensity level that is 60% of the white intensity level. In another example, if the digital model covers 80% of the volume of a voxel, then the process can assign an intensity level that is 80% of the white intensity level. The one or more grayscale intensity levels are greater than a black intensity level, but less than the white intensity level assigned at 420. The one or more grayscale intensity levels are not sufficient to completely cure the photoactive resin during the predetermined curing time. In some implementations, the process can adjust the one or more grayscale intensity levels based on a nonlinear characteristic of a light source within the 3D printer, a nonlinear characteristic of the photoactive resin, or both. For example, a photoactive resin may have a nonlinear relationship between intensity levels and a curing degree. In cases where the nonlinearity is substantially a power function (e.g., $y=x^\gamma$), an adjustment can be performed by applying the inverse power ($1/\gamma$) to the grayscale intensity levels, e.g., by performing gamma correction. Alternatively, a lookup table can be applied to correct for arbitrary nonlinearities. In some implementations, the intensity levels are R-bit values, where R is a predetermined number of bits associated with a graphic file format that range from 0 (black) to 255 (white). For example, the intensity levels can be represented as 8-bit values that range from 0 (black) to 255 (white). Other values for R are possible.

At 440, the process generates one or more graphic files based on the white, grayscale, and black voxels, and the assigned intensity levels. In some implementations, the model is sliced into N layers in the Z dimension and the process outputs a graphic file such as a file in accordance with a file format such as Portable Network Graphics (PNG) for each layer. In some implementations, the process outputs a graphic file containing multiple bitmaps for respective layers.

At 445, the process sends the one or more graphic files to the 3D printer. In some implementations, sending the one or more graphic files can include transmitting data via a network connection (e.g., wireline or wirelessly) or Universal Serial Bus (USB). In some implementations, a 3D printer can receive the digital model itself, perform the process of FIG. 4, and send the contents of the one or more graphic files to a light projection device within the 3D printer. Sending the contents can include transmitting a sequence of bits over a serial bus between a controller and a projection system. In some implementations, a standalone computer performs the process of FIG. 4 and sends the contents of the one or more graphic files to the 3D printer via a wireline or wireless connection.

Figure 5:
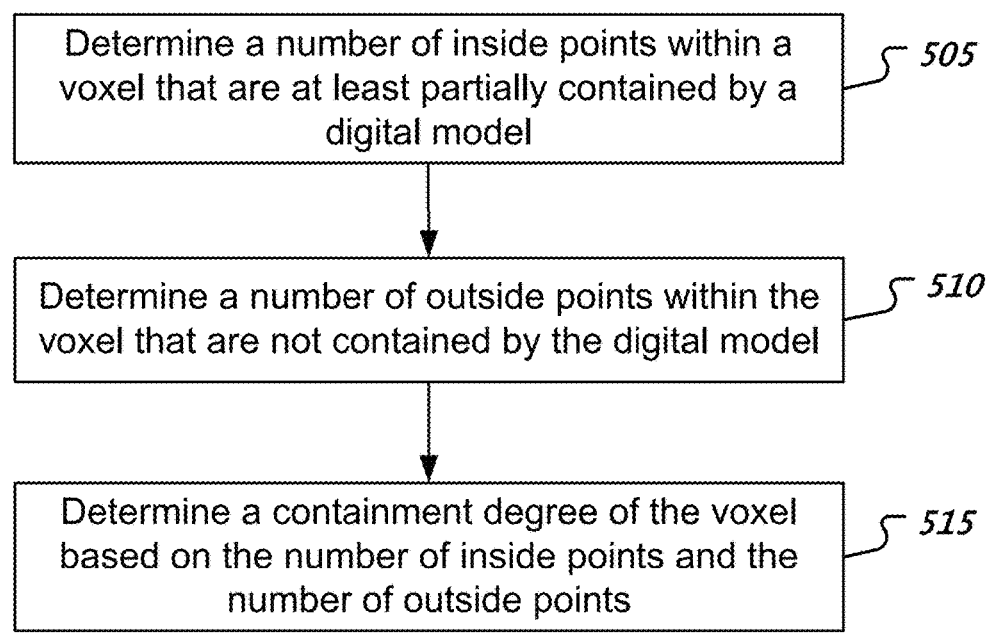
FIG. 5 shows a flowchart of an example of a process that determines a containment degree based on a sampling technique.

FIG. 5 shows a flowchart of an example of a process that determines a containment degree based on a sampling technique. At 505, the process determines a number of inside points (n) within a voxel that are at least partially contained by the digital model. At 510, the process determines a number of outside points (m) within the voxel that are not contained by the digital model. At 515, the process determines a containment degree of the voxel based on the number of inside points and the number of outside points. In some implementations, the containment degree equals n/(n+m). In some implementations, voxels are sliced into corresponding pixels and containment degrees are computed based on samples taken within the corresponding pixels. Determining a containment degree of a pixel can include determining a number of inside points within the pixel that are at least partially contained by a digital model, determining a number of outside points within the pixel that are not contained by the digital model, and determining the containment degree based on the number of first points divided by the number of first and second points.

Figure 6:
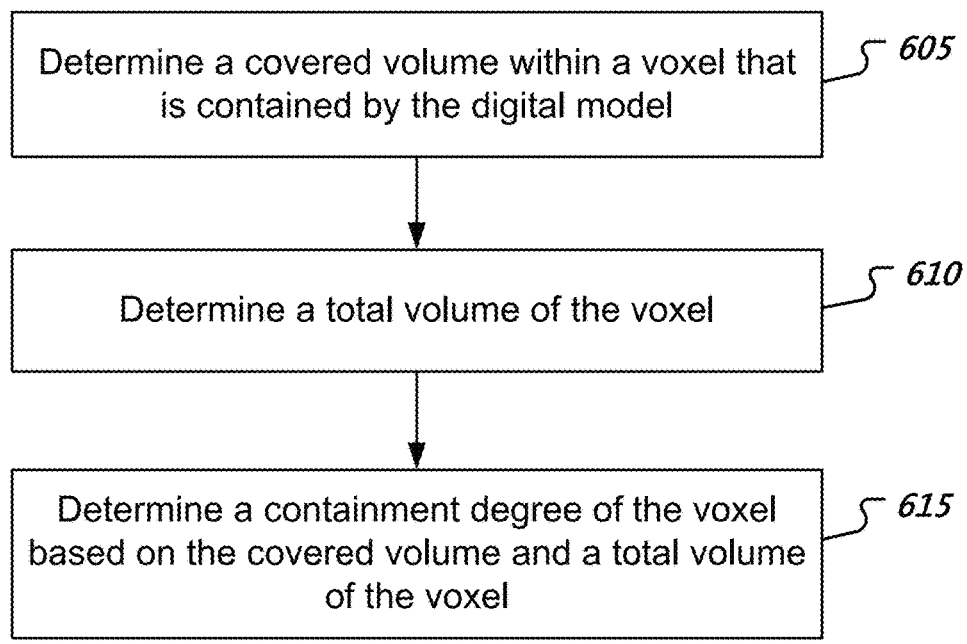
FIG. 6 shows a flowchart of an example of a process that determines a containment degree based on a geometric technique.

FIG. 6 shows a flowchart of an example of a process that determines a containment degree based on a geometric technique. At 605, the process determines a covered volume within a voxel that is contained by the digital model. In some implementations, determining a covered volume can include determining the interception of a model's boundary surface with a voxel to determine a volume covered by the model. In some implementations, determining a covered volume can include determining the interception of a model's boundary line with a cross-section of a voxel to determine an area covered by the model. In some implementations, the determined covered area can be extrapolated to a covered volume. At 610, the process determines a total volume of the voxel. In some implementations, the total volume is computed once for voxels of the same size. In some implementations, the total volume is based on printer resolution parameters for the X, Y, and Z dimensions. At 615, the process determines a containment degree of the voxel based on the covered volume and the total volume of the voxel. In some implementations, voxels are sliced into corresponding pixels and containment degrees are computed based on the corresponding pixels and the geometry of the model.

Figure 7:
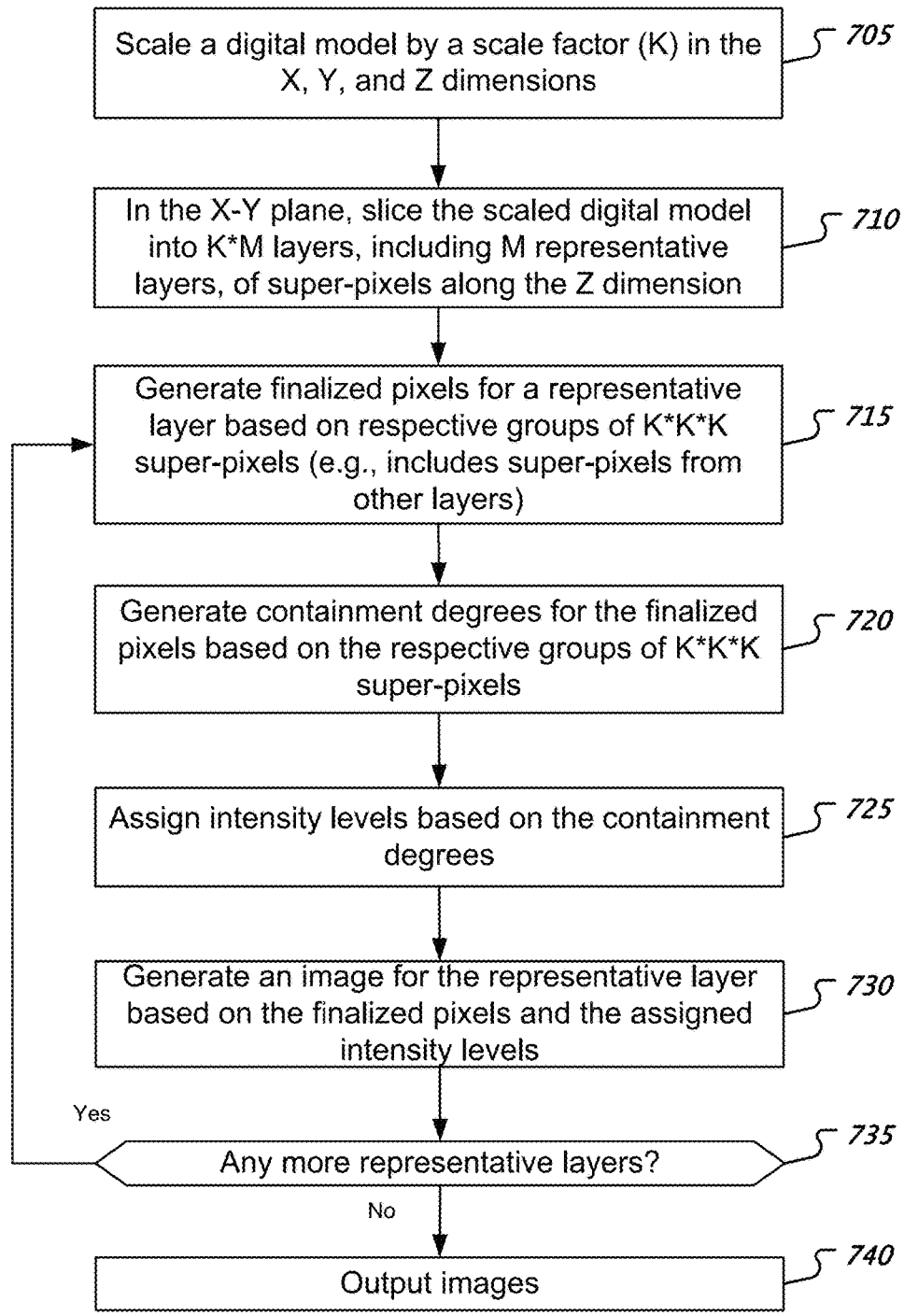
FIG. 7 shows a flowchart of an example of a super-sampling process.

FIG. 7 shows a flowchart of an example of a super-sampling process. At 705, the process scales a digital model by a scale factor (K) in the X, Y, and Z dimensions. In some implementations, a different scale factor is applied to each dimension. At 710, the process in the X-Y plane, slices the scaled digital model into K*M layers, including M representative layers, of super-pixels along the Z dimension. In some implementations, the number of M layers is based on a vertical resolution of a 3D printer and a vertical size of the digital model or a target output size specified by a build parameter. In some implementations, the process can select every Kth slice of the scaled digital mode to produce M representative layers.

At 715, the process generates finalized pixels for a representative layer based on respective groups of K*K*K super-pixels. A group can include K*K super-pixels in the current representative layer and super-pixels from surrounding layers, e.g., layers above, layers below, or both. In some implementations, a group of K*K*K super-pixels represents a cube of super-pixels centered around a pixel in a representative layer. In some implementations, the process can transform a group of K*K*K super-pixels into a finalized pixel based on a combination of the K*K*K super-pixels such as an average or weighted average. Other techniques to combine super-pixels are possible.

At 720, the process generates containment degrees for the finalized pixels based on the respective groups of K*K*K super-pixels. At 725, the process assigns intensity levels based on the containment degrees. In some implementations, the intensity levels are gamma corrected based on nonlinearities associated with the printer's projection system, resin, or both.

At 730, the process generates an image for the representative layer based on the finalized pixels and the assigned intensity levels. At 735, the process determines if there are any more layers to process. If so, then the process continues to process the next representative layer at 710. Otherwise, at 740, the process outputs the images for respective representative layers of the digital model.

Figure 8:
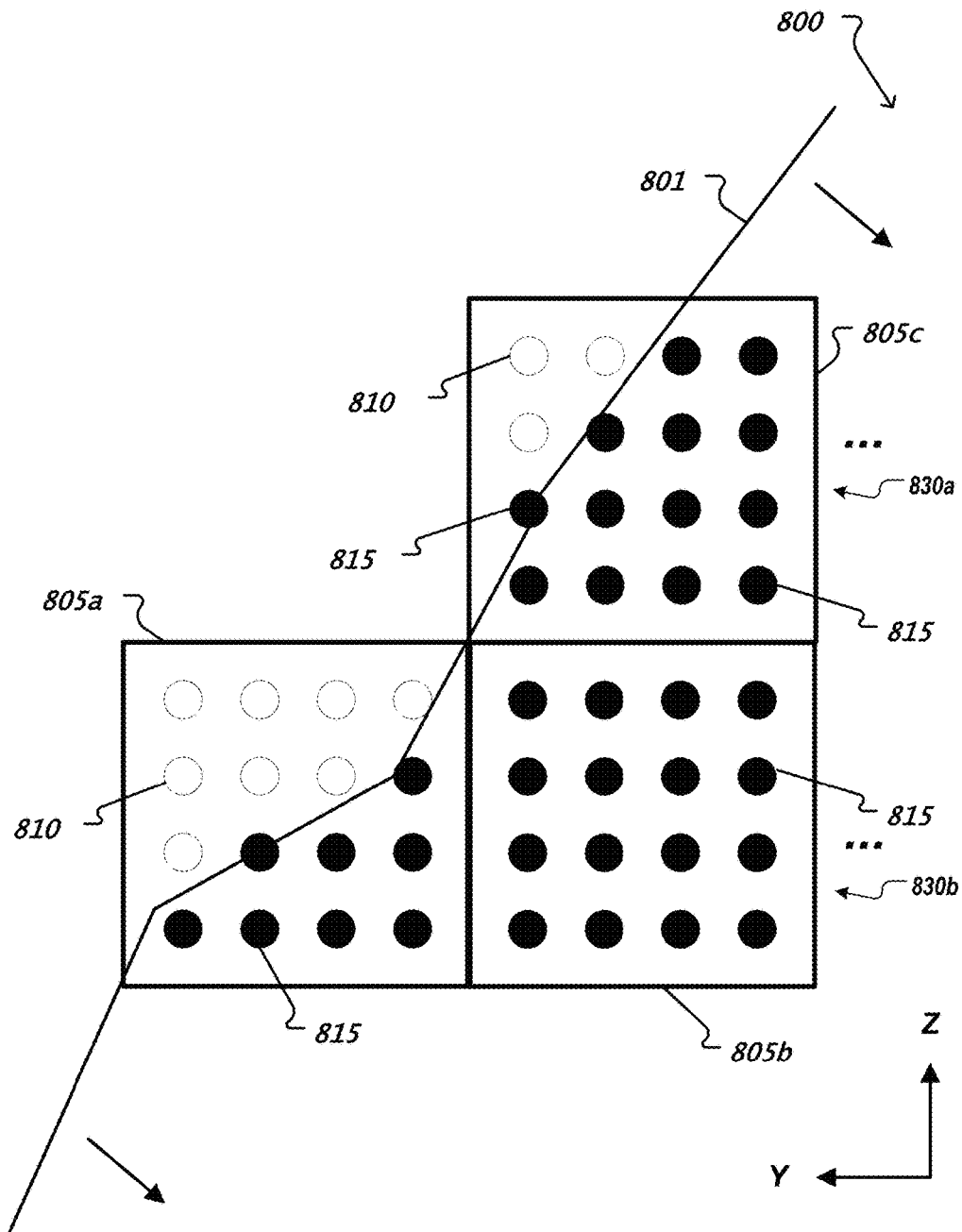
FIG. 8 shows an example of a sampling technique applied to sample points within several voxel cross-sections associated with a digital model to determine containment degrees for respective voxels.

FIG. 8 shows an example of a sampling technique applied to sample points within several voxel cross-sections associated with a digital model 800 to determine containment degrees for respective voxels. The digital model 800 can specify a boundary surface of a structure. In a cross-section, this boundary surface can be represented as a boundary line 801. The boundary line 801 can be straight, curved, segmented, etc. Further, the boundary line 801 can span multiple layers of the digital model 800. The digital model 800 can be mapped onto voxels including voxels 805a, 805b, and 805c. Voxels 805a, 805b are in a layer 830b of the digital model 800, while voxel 805c is on an immediately subsequent layer 830a. Some voxels and points therein are contained within the digital model 800, while others are not. Here, points 815 within the voxels 805a-c that are on and to the right of the boundary line 801 are considered to be contained within the digital model 800. In this example, voxel 805b is fully contained within the digital model 800, and accordingly all sample points 815 within the voxel 805b are also fully contained within the digital model 800; these points 815 are depicted by solid black circles and can be referred to as inside points.

Other voxels 805a, 805c are partially contained within the digital model 800. As such, some points 810 within these voxels 805a, 805c are not contained within the digital model 800; these points 810 are depicted by white circles and can be referred to as outside points. Further, the other points 815 within these voxels 805a, 805c are fully contained within the digital model 800. In some implementations, a containment degree for a voxel is based on the number of inside points divided by the total number of points, e.g., inside plus outside points. In some implementations, the total number of points within a voxel can be determined based on one or more 3D printer resolution parameters. In some implementations, a cross-section of a voxel is used for sampling purposes. In some implementations, the entire volume of a voxel is used for sampling purposes. The number of sample points within the voxels 805a-c can be based on factors such as a required level of accuracy or available computational resources.

Figure 9:
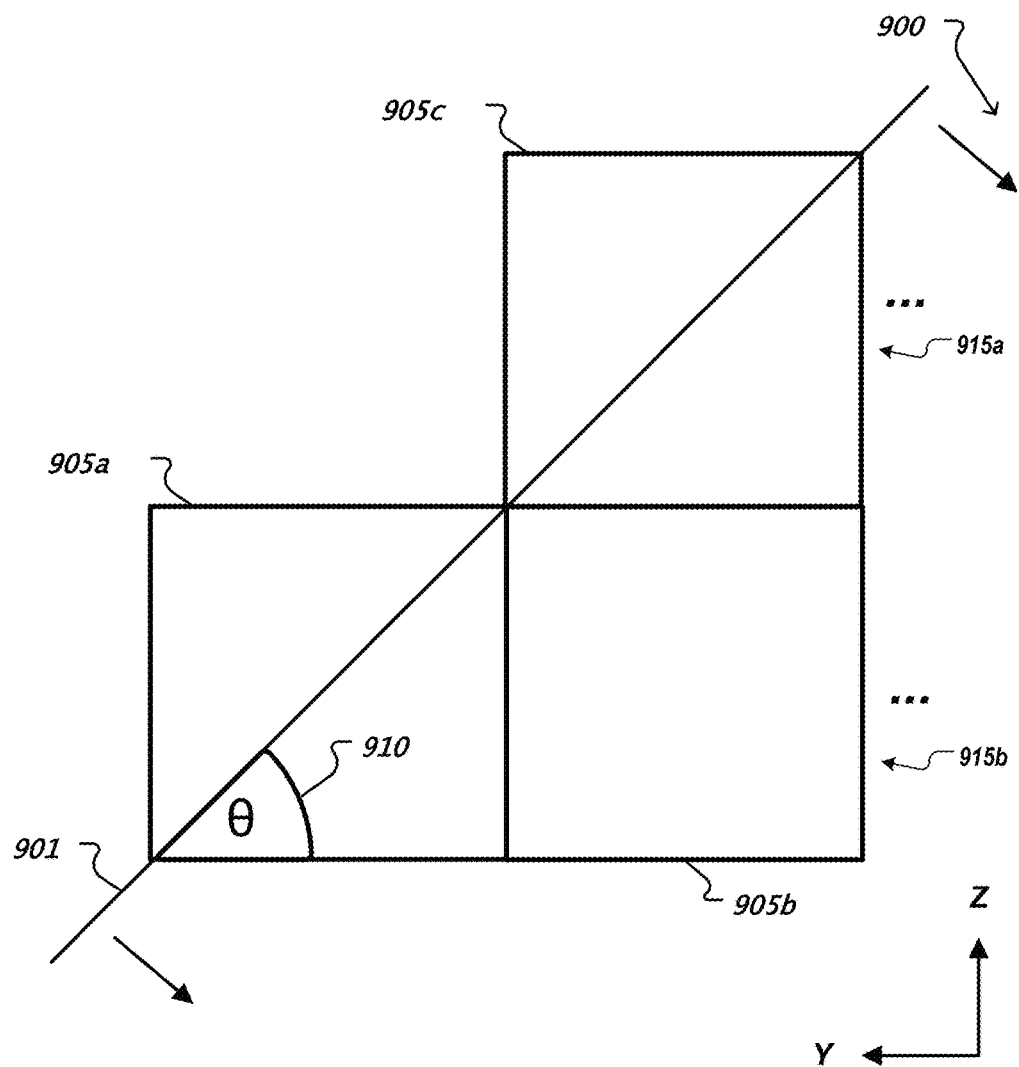
FIG. 9 shows an example of a geometric technique applied to sample points within several voxel cross-sections associated with a digital model to determine containment degrees for respective voxels.

FIG. 9 shows an example of a geometric technique applied to sample points within several voxel cross-sections associated with a digital model 900 to determine containment degrees for respective voxels. The digital model 900 can specify a boundary surface of a structure. In a cross-section, this boundary surface can be represented as a boundary line 901. The boundary line 901 can span multiple layers of the digital model 900. The digital model 900 can be mapped onto voxels including voxels 905a, 905b, and

905c. Voxels 905a, 905b are in a layer 915b of the digital model 900, while voxel 905c is on an immediately subsequent layer 915a of the digital model 900. Some voxels and some portions therein are contained within the digital model 900, while others are not. Portions within the voxels 905a-c that are on and to the right of the boundary line 901 are considered to be contained within the digital model 900.

In some implementations, a cross-section of a voxel is used to compute an area of the cross-section that is contained within the digital model 900. In some implementations, the entire voxel is used to compute a volume of the voxel that is contained within the digital model 900. In some implementations, a file that provides information about a digital model 900 can include information to construct triangles or other shapes on a surface of a structure. Such information can be used to determine an angle 910 between the boundary line 901 and a side of a voxel 905a. In this example, the angle 910 is 45 degrees and thus the boundary line 901 equally divides the area of voxel 905a in half, e.g., the inside area is equal to the outside area which yields a containment degree of 50%. Other geometric relations and computations are possible to derive containment degrees from the digital model 900.

Figures 10A, 10B:
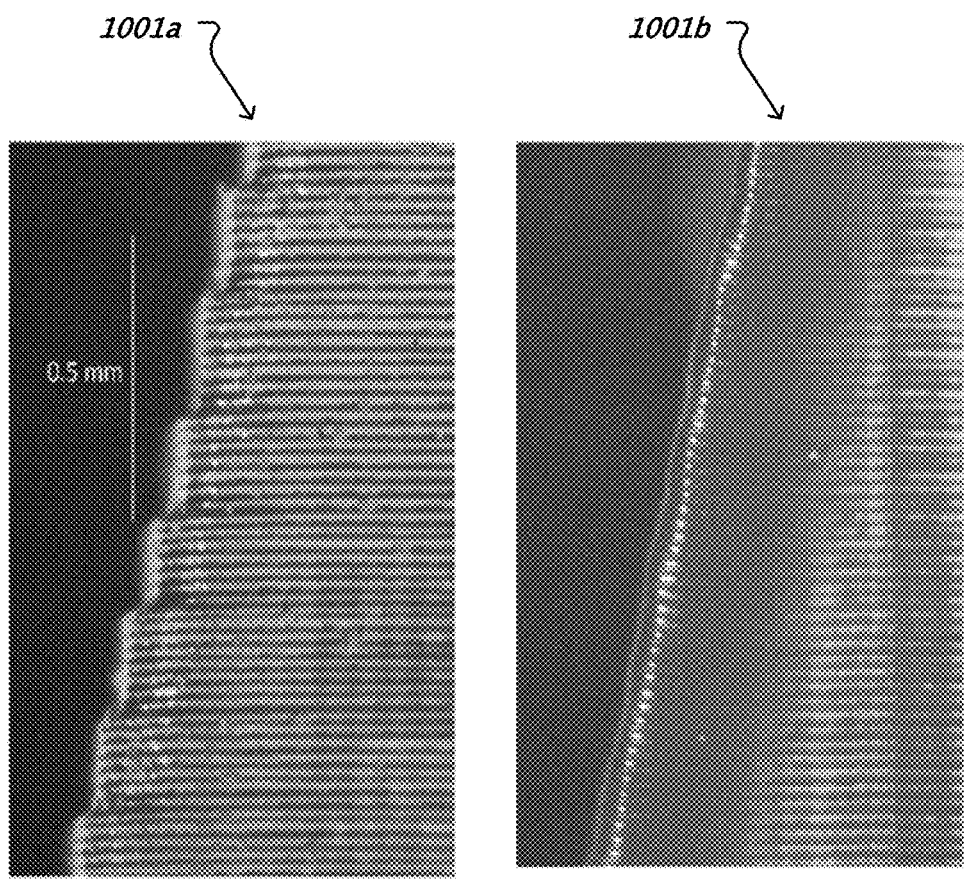
FIGS. 10A and 10B show a cross-section of an example of a 3D structure printed without and with grayscale intensity values from the same digital model.

FIGS. 10A and 10B show a cross-section of an example of a 3D structure printed without and with grayscale intensity values from the same digital model. FIG. 10A shows a cross-sectional image 1001a of a 3D structure that was printed without using grayscale intensity values, e.g., black and white intensity values were used. FIG. 10B shows a cross-sectional image 1001b of a 3D structure that was printed using grayscale intensity values in addition to black and white intensity values. In this example, the grayscale intensity values caused sub-pixel features to be created which more accurately represent the digital model, e.g., a smoother edge is formed as shown in image 1001b rather than a jagged, stair-stepped edge as shown in image 1001a.

Figure 11A:
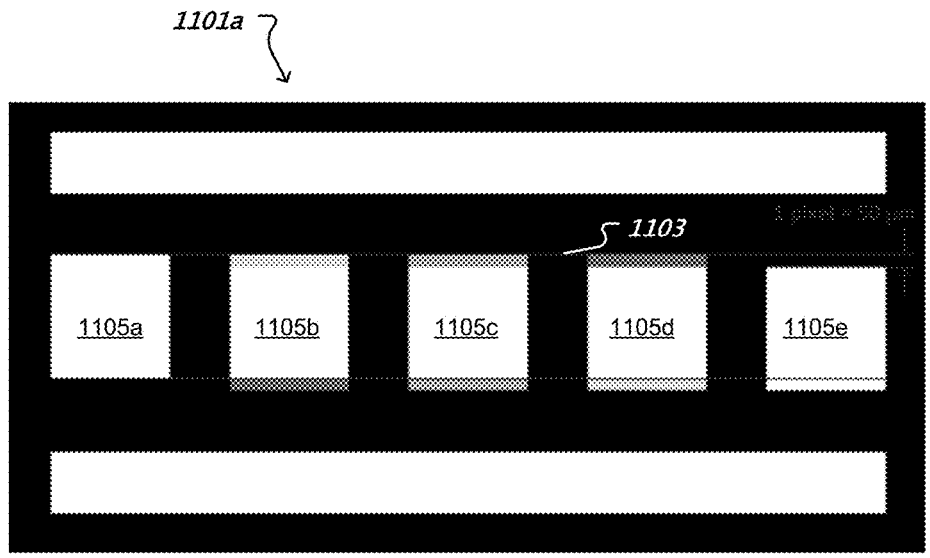
FIGS. 11A and 11B show sub-pixel resolution aspects of a 3D structure printed with grayscale intensity values.
Figure 11B:
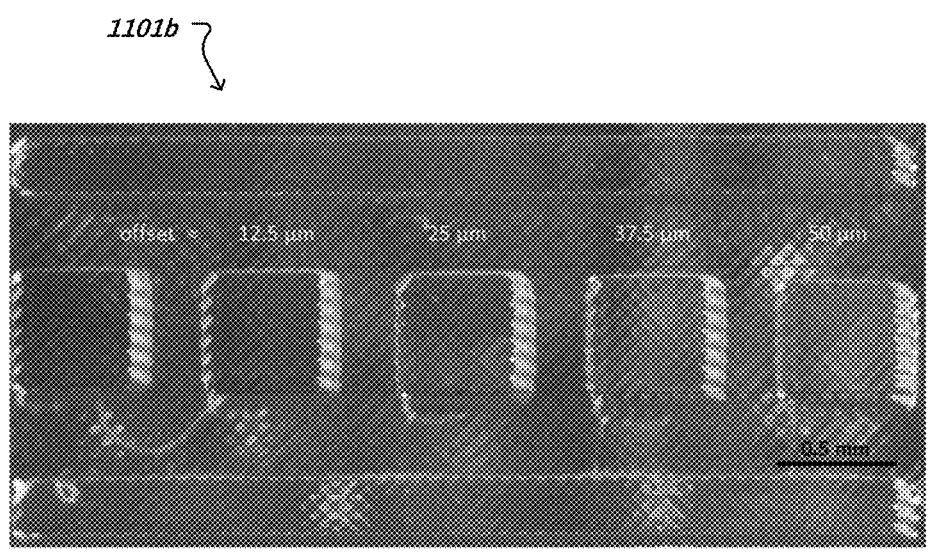

FIGS. 11A and 11B show sub-pixel resolution aspects of a 3D structure printed with grayscale intensity values. FIG. 11A shows a mask image 1101a to generate a 3D structure that has several vertical features 1105a-e that are placed at different offsets from a reference line 1103. The mask image 1101a represents a layer of a digital model and can be created using a grayscale technique described herein. The mask image 1101a is used by a light projection device to grow the features 1105a-e in the Z axis. The 3D structure is printed using a 3D printer have a 50×50 micron resolution in the X-Y plane such as the Ember 3D printer available from Autodesk, Inc. of San Rafael, Calif. Feature 1105a is at a zero offset from the reference line 1103, feature 1105b is at a 12.5 micron offset, feature 1105c is at a 25 micron offset, feature 1105d is at a 37.5 micron offset, feature 1105d is at a 37.5 micron offset, and feature 1105e is at a 50 micron offset. Grayscale values are used to generate the sub-pixel placement of the edges for features 1105b, 1105c, and 1105d. FIG. 11B shows an image 1101b of the 3D structure created by a 3D printer using the mask image 1101a of FIG. 11A. As shown, sub-pixel placement of features 1105b, 1105c, and 1105d is possible.

A 3D printer, in some implementations, can include a vat capable of holding a liquid comprising a photoactive resin, wherein the vat includes a window; a build plate configured and arranged to move within the vat during three-dimensional printing of a solid structure on the build plate; a light source to project light through the window; and a controller to control the printing of the solid structure and to modulate light between the light source and the window through individual pixels. The controller can be configured to project first light into the window of the vat based on a first group of the pixels during a curing time to form a layer of the solid structure, the first light having a predetermined wavelength and a first intensity that is sufficient to cure at least a portion of the photoactive resin during the curing time. The controller can be configured to project second light into the window of the vat based on a second group of the pixels during the curing time to form the layer of the solid structure, the second light having the predetermined wavelength, the second light having a second intensity lesser than the first intensity. In some implementations, the controller can be configured to inhibit light from reaching the window of the vat based on a third group of the pixels during the curing time. In some implementations, the controller can be configured to not produce light based on a third group of the pixels during the curing time.

A 3D printer, in some implementations, can include a vat capable of holding a liquid comprising a photoactive resin, wherein the vat includes a window; a build plate configured and arranged to move within the vat during three dimensional printing of a solid structure on the build plate; a light source to project light through the window; and a controller to control the printing of the solid structure and to modulate light between the light source and the window, the light being modulated in accordance with individual pixels of a two-dimensional array, wherein the controller is configured to project first light into the window of the vat based on a first proper subset of the pixels during a curing time to form a layer of the solid structure, the first light having a predetermined wavelength and a first intensity that is sufficient to cure at least a portion of the photoactive resin during the curing time, project second light into the window of the vat based on a second proper subset of the pixels during the curing time to form the same layer of the solid structure, the second light having the predetermined wavelength, the second light having a second intensity lesser than the first intensity; wherein the first and second proper subsets do not include all of the pixels in the two-dimensional array.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by, and/or under the control of, one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other embodiments are within the scope of the following claims.

What is claimed is:

1. A method for processing a three-dimensional structure for printing by a three-dimensional printer at sub-pixel precision, comprising:
   (a) obtaining, by a data processing apparatus, a digital model of the three-dimensional structure, and slicing the digital model into a plurality of two-dimensional slices of the digital model of the three-dimensional structure;

(b) mapping, by the data processing apparatus, a two-dimensional slice of the plurality of two-dimensional slices onto a two-dimensional grid of pixels, wherein the two-dimensional grid of pixels comprises a plurality of points;

(c) calculating a number of the plurality of points within each pixel of the two-dimensional grid of pixels that overlap with the two-dimensional slice to determine a degree of containment of the two-dimensional slice with respect to the two-dimensional grid of pixels, and using at least the number to determine at least a first set of pixels, a second set of pixels, and a third set of pixels, wherein one or more pixels of the first set of pixels have a greater number of points than one or more pixels of the second set of pixels, and wherein the one or more pixels of the second set of pixels have a greater number of points than one or more pixels of the third set of pixels;

(d) generating a light intensity level profile corresponding to the two-dimensional grid of pixels, which generating comprises assigning, by the data processing apparatus, (i) first intensity level of light comprising a wavelength or range of wavelengths to the one or more pixels of the first set of pixels, wherein the first intensity level is sufficient to cure photoactive resin during a predetermined curing time associated with the three-dimensional printer, (ii) a second intensity level of the light comprising the wavelength or range of wavelengths to the one or more pixels of the second set of pixels, wherein the second intensity level is less than the first intensity level, and (iii) a third intensity level of the light comprising the wavelength or range of wavelengths to the one or more pixels of the third set of pixels, wherein the third intensity level is less than the second intensity level, wherein the light intensity level profile corresponds to the degree of containment of the two-dimensional slice with respect to the two-dimensional grid of pixels;

(e) storing the light intensity level profile corresponding to the two-dimensional grid of pixels in computer memory, wherein the light intensity level profile and the two-dimensional grid of pixels are usable by the three-dimensional printer to print at least a portion of the three-dimensional structure from the photoactive resin at the sub-pixel precision.

2. The method of claim 1, comprising:
(f) sending the light intensity level profile corresponding to the two-dimensional grid of pixels to the three-dimensional printer.

3. The method of claim 1, further comprising, in (c):
adjusting the second intensity level of the light based at least in part on a nonlinear characteristic of the photoactive resin.

4. The method of claim 1, comprising:
adjusting the second intensity level of the light based at least in part on a nonlinear characteristic of a light source associated with the three-dimensional printer.

5. The method of claim 1, further comprising, in (a):
scaling the digital model of the three-dimensional structure based at least in part on a scaling factor, and slicing the scaled digital model of the three-dimensional structure into the plurality of two-dimensional slices.

6. The method of claim 5, wherein a plurality of dimensions associated with the digital model of the three-dimensional structure is scaled by the same scaling factor.

7. The method of claim 5, wherein a plurality of dimensions associated with the digital model of the three-dimensional structure is scaled by different scaling factors.

8. The method of claim 1, further comprising, in (c), a plurality of levels of the second intensity level of the light to a plurality of pixels of the second set of pixels.

9. The method of claim 1, wherein the one or more pixels of the second set of pixels of the two-dimensional grid of pixels correspond to a portion of the three-dimensional structure.

10. A system for processing a three-dimensional structure for printing by a three-dimensional printer at sub-pixel precision, comprising:
a data processing apparatus in digital communication with computer memory, wherein the data processing apparatus is configured to:
obtain a digital model of the three-dimensional structure, and slice the digital model into a plurality of two-dimensional slices of the digital model of the three-dimensional structure;
map a two dimensional slice of the plurality of two-dimensional slices onto a two-dimensional grid of pixels, wherein the two-dimensional grid of pixels comprises a plurality of points;
calculate a number of the plurality of points within each pixel of the two-dimensional grid of pixels that overlap with the two-dimensional slice to determine a degree of containment of the two-dimensional slice with respect to the two-dimensional grid of pixels, and use at least the number to determine at least a first set of pixels, a second set of pixels, and a third set of pixels, wherein one or more pixels of the first set of pixels have a greater number of points than one or more pixels of the second set of pixels, and wherein the one or more pixels of the second set of pixels have a greater number of points than one or more pixels of the third set of pixels;
generate a light intensity level profile corresponding to the two-dimensional grid of pixels, which generating comprises assigning (i) a first intensity level of light comprising a wavelength or range of wavelengths to the one or more pixels of the first set of pixels, wherein the first intensity level is sufficient to cure photoactive resin during a predetermined curing time associated with the three-dimensional printer, (ii) a second intensity level of the light comprising the wavelength or range of wavelengths to the one or more pixels of the second set of pixels, wherein the second intensity level is less than the first intensity level, and (iii) a third intensity level of the light comprising the wavelength or range of wavelengths to the one or more pixels of the third set of pixels, wherein the third intensity level is less than the second intensity level, wherein the light intensity level profile corresponds to the degree of containment of the two-dimensional slice with respect to the two-dimensional grid of pixels; and
store the light intensity level profile corresponding to the two-dimensional grid of pixels in the computer memory, wherein the light intensity level profile and the two-dimensional grid of pixels are usable by the three-dimensional printer to print at least a portion of the three-dimensional structure from the photoactive resin at the sub-pixel precision.

11. The system of claim 10, wherein the data processing apparatus is further configured to send the light intensity level profile corresponding to the two-dimensional grid of pixels to the three-dimensional printer.

12. The system of claim 10, wherein the data processing apparatus is further configured to adjust the second intensity level of the light based at least in part on a nonlinear characteristic of the photoactive resin.

13. The system of claim 10, wherein the data processing apparatus is further configured to adjust the second intensity level of the light based at least in part on a nonlinear characteristic of a light source associated with the three-dimensional printer.

14. The system of claim 10, wherein the data processing apparatus is further configured to scale the digital model of the three-dimensional structure based at least in part on a scaling factor, and slice the scaled digital model of the three-dimensional structure into the plurality of two-dimensional slices.

15. The system of claim 14, wherein a plurality of dimensions associated with the digital model of the three-dimensional structure is scaled by the same scaling factor.

16. The system of claim 14, wherein a plurality of dimensions associated with the digital model of the three-dimensional structure is scaled by different scaling factors.

17. The system of claim 10, wherein the data processing apparatus is further configured to assign a plurality of levels of the second intensity level of the light to a plurality of pixels of the second set of pixels.

18. The system of claim 10, wherein the one or more pixels of the second set of pixels of the two-dimensional grid of pixels correspond to a portion of the three-dimensional structure.

* * * * *

UNITED STATES PATENT AND TRADEMARK OFFICE
CERTIFICATE OF CORRECTION

PATENT NO. : 10,354,445 B2
APPLICATION NO. : 15/287205
DATED : July 16, 2019
INVENTOR(S) : Richard M. Greene and Ryan Michael Schmidt It is certified that error appears in the above-identified patent and that said Letters Patent is hereby corrected as shown below:

In the Claims

In Claim 1, Column 15, Line 23, please:
Add the text -- a -- between the text "(i)" and "first"

In Claim 1, Column 15, Line 40, please:
Add the text -- and -- between the text "pixels;" and "(e)"

Signed and Sealed this
Seventeenth Day of September, 2019

Andrei Iancu
*Director of the United States Patent and Trademark Office*